(12) United States Patent
Ikawa et al.

(10) Patent No.: US 12,210,838 B2
(45) Date of Patent: *Jan. 28, 2025

(54) ESTIMATING OUTPUT CONFIDENCE FOR BLACK-BOX API

(71) Applicant: INTERNATIONAL BUSINESS MACHINES CORPORATION, Armonk, NY (US)

(72) Inventors: Yohei Ikawa, Kanagawa-ken (JP); Issei Yoshida, Setagaya-ku (JP); Sachiko Yoshihama, Kawasaki (JP); Miki Ishikawa, Yokohama (JP); Kohichi Kamijoh, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,970

(22) Filed: Aug. 15, 2023

(65) Prior Publication Data

US 2023/0394243 A1    Dec. 7, 2023

Related U.S. Application Data

(63) Continuation of application No. 16/853,420, filed on Apr. 20, 2020, now Pat. No. 11,775,764.

(51) Int. Cl.
*G06F 40/30* (2020.01)
*G06F 16/242* (2019.01)
(Continued)

(52) U.S. Cl.
CPC ............ *G06F 40/30* (2020.01); *G06F 16/242* (2019.01); *G06F 16/3344* (2019.01);
(Continued)

(58) Field of Classification Search
CPC .... G06F 40/30; G06F 16/242; G06F 16/3344; G06F 16/36; G06F 18/217; G06F 18/22;
(Continued)

(56) References Cited

U.S. PATENT DOCUMENTS

| | | | |
|---|---|---|---|
| 10,318,642 | B2 | 6/2019 | Fujiwara et al. |
| 2014/0358519 | A1 | 12/2014 | Mirkin et al. |
| 2021/0383489 | A1* | 12/2021 | Hutchinson ............. G06F 16/29 |

FOREIGN PATENT DOCUMENTS

| | | |
|---|---|---|
| JP | 2017091368 | 5/2017 |
| WO | WO2019080648 A1 | 5/2019 |

OTHER PUBLICATIONS

Alzantot, Moustafa, et al. "Generating natural language adversarial examples." arXiv preprint arXiv:1804.07998 (2018) (Year: 2018).*

(Continued)

*Primary Examiner* — Jesse S Pullias
*Assistant Examiner* — Michael C. Lee
(74) *Attorney, Agent, or Firm* — Tutunjian & Bitetto, P.C.; Robert Richard Aragona (57) ABSTRACT

A computer-implemented method is provided for estimating output confidence of a black box Application Programming Interface (API). The method includes generating paraphrases for an input text. The method further includes calculating a distance between the input text and each respective one of the paraphrases. The method also includes sorting the paraphrases in ascending order of the distance. The method additionally includes selecting a top predetermined number of the paraphrases. The method further includes inputting the input text and the selected paraphrases into the API to obtain an output confidence score for each of the input text and the selected paraphrases. The method also includes estimating, by a hardware processor, the output (Continued)

confidence of the input text from a robustness of output scores of the input text and the selected paraphrases.

25 Claims, 10 Drawing Sheets

(51) Int. Cl.
| | |
|---|---|
| *G06F 16/33* | (2019.01) |
| *G06F 16/36* | (2019.01) |
| *G06F 18/21* | (2023.01) |
| *G06F 18/22* | (2023.01) |
| *G06F 18/2321* | (2023.01) |
| *G06F 40/10* | (2020.01) |
| *G06F 40/247* | (2020.01) |
| *G06F 40/289* | (2020.01) |
| *G06F 40/40* | (2020.01) |
| *G10L 15/18* | (2013.01) |

(52) U.S. Cl.
CPC ............ *G06F 16/36* (2019.01); *G06F 18/217* (2023.01); *G06F 18/22* (2023.01); *G06F 18/2321* (2023.01); *G06F 40/10* (2020.01); *G06F 40/247* (2020.01); *G06F 40/289* (2020.01); *G06F 40/40* (2020.01); *G10L 15/1822* (2013.01)

(58) Field of Classification Search
CPC .... G06F 18/2321; G06F 40/10; G06F 40/247; G06F 40/289; G06F 40/40; G06F 40/56; G10L 15/1822
See application file for complete search history.

(56) References Cited

OTHER PUBLICATIONS

Pruthi, Danish, et al. "Combating adversarial misspellings with robust word recognition." arXiv preprint arXiv:1905.11268 (2019), pp. 1-10 (Year: 2019).*

Kobayashi, "Contextual Augmentation: Data Augmentation by Words with Paradigmatic Relations", augarXiv: 1805.06201v1 [cs.CL] May 16, 2018, 6 pages.

Malakasiotis et al., "A Generate and Rank Approach to Sentence Paraphrasing", Proceedings of the 2011 Conference on Empirical Methods in Natural Language Processing, Jul. 2011, pp. 96-106.

Mell et al. "The NIST Definition of Cloud Computing", NIST Special Publication 800-145, 2011, 7 pages.

Wieting et al., "Learning Paraphrastic Sentence Embeddings from Back-Translated Bitext", Proceedings of the 2017 Conference on Empirical Methods in Natural Language Processing, Sep. 2017, pp. 274-285.

IBM, "Watson", available at: https://www.ibm.com/watson/services/natural-language-classifier/, last downloaded on Jan. 27, 2020, 17 pages.

List of IBM Patents or Patent Applications Treated as Related dated Aug. 15, 2023, 2 pages.

* cited by examiner

ESTIMATING OUTPUT CONFIDENCE FOR BLACK-BOX API

BACKGROUND

The present invention generally relates to analytics, and more particularly to estimating the output confidence for a black-box Application Programming Interface (API).

An API is a computing interface that is accessible by a particular software program, library, operating system or internet service, to allow third parties to use the functionality of that software application. A block-box API has features such as being unable to be tuned up and retrained, as well as the internal logic and training data being unknown.

SUMMARY

According to aspects of the present invention, a computer-implemented method is provided for estimating output confidence of a black box Application Programming Interface (API). The method includes generating paraphrases for an input text. The method further includes calculating a distance between the input text and each respective one of the paraphrases. The method also includes sorting the paraphrases in ascending order of the distance. The method additionally includes selecting a top predetermined number of the paraphrases. The method further includes inputting the input text and the selected paraphrases into the API to obtain an output confidence score for each of the input text and the selected paraphrases. The method also includes estimating, by a hardware processor, the output confidence of the input text from a robustness of output scores of the input text and the selected paraphrases.

According to other aspects of the present invention, a computer program product is provided for estimating output confidence of a black box Application Programming Interface (API). The computer program product includes a non-transitory computer readable storage medium having program instructions embodied therewith. The program instructions are executable by a computer to cause the computer to perform a method. The method includes generating paraphrases for an input text. The method further includes calculating a distance between the input text and each respective one of the paraphrases. The method also includes sorting the paraphrases in ascending order of the distance. The method additionally includes selecting a top predetermined number of the paraphrases. The method further includes inputting the input text and the selected paraphrases into the API to obtain an output confidence score for each of the input text and the selected paraphrases. The method also includes estimating the output confidence of the input text from a robustness of output scores of the input text and the selected paraphrases.

According to yet other aspects of the present invention, a computer processing system is provided for determining command-to-process correspondence. The computer processing system includes a memory device including program code stored thereon. The computer processing system further includes a hardware processor, operatively coupled to the memory device, and configured to run the program code stored on the memory device to generate paraphrases for an input text. The hardware processor is further configured to run the program code to calculate a distance between the input text and each respective one of the paraphrases. The hardware processor is also configured to run the program code to sort the paraphrases in ascending order of the distance. The hardware processor is additionally configured to run the program code to select a top predetermined number of the paraphrases. The hardware processor is further configured to run the program code to input the input text and the selected paraphrases into the API to obtain an output confidence score for each of the input text and the selected paraphrases. The hardware processor is also configured to run the program code to estimate the output confidence of the input text from a robustness of output scores of the input text and the selected paraphrases.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to estimating the output confidence for a black-box Application Programming Interface (API).

One or more embodiments of the present invention are directed to black-box APIs having features such as being unable to be tuned up or retrained as well as having the internal logic and training data being unknown.

One or more embodiments of the present invention are directed to black-box APIs such that the input to the black-box APIs is natural language text and the output from the black-box APIs is a numerical score.

One or more embodiments of the present invention can effectively remove input data which the API tends to mistake, based on the output confidence. In this way, only data which tends to not be mistaken by the API is input to the API to ensure acceptable output results therefrom.

One or more embodiments of the present invention estimate the output confidence for each input text by evaluating the robustness of multiple output scores from paraphrases of the original input text. One or more embodiments of the present invention evaluate the robustness by choosing paraphrases with small distance from the original input text. The smaller the distance, the more robust the corresponding output score.

Figure 1:
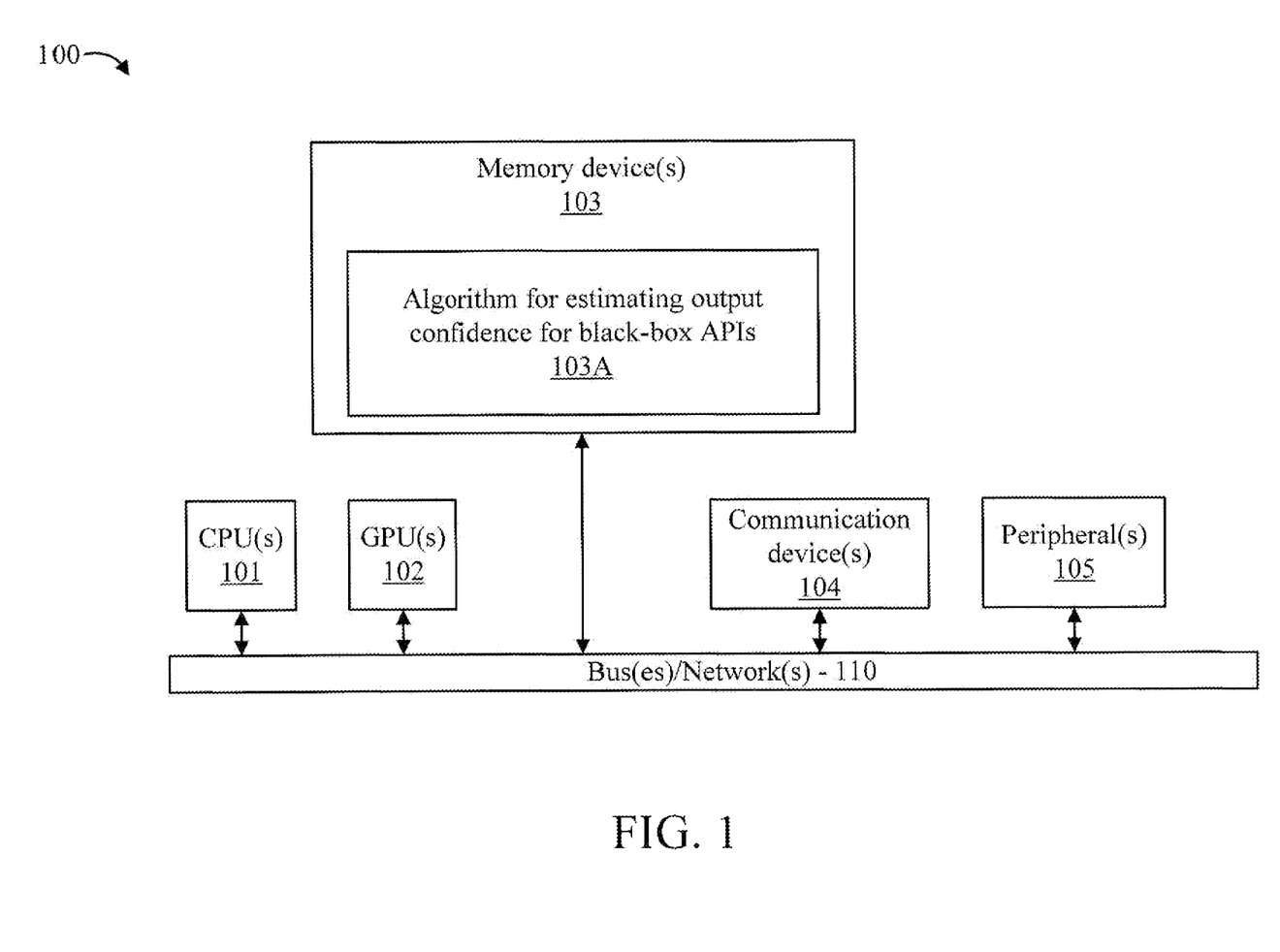
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, memory devices 103 include an algorithm 103A for estimating output confidence for black-box Application Programming Interfaces (APIs).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 7-8). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
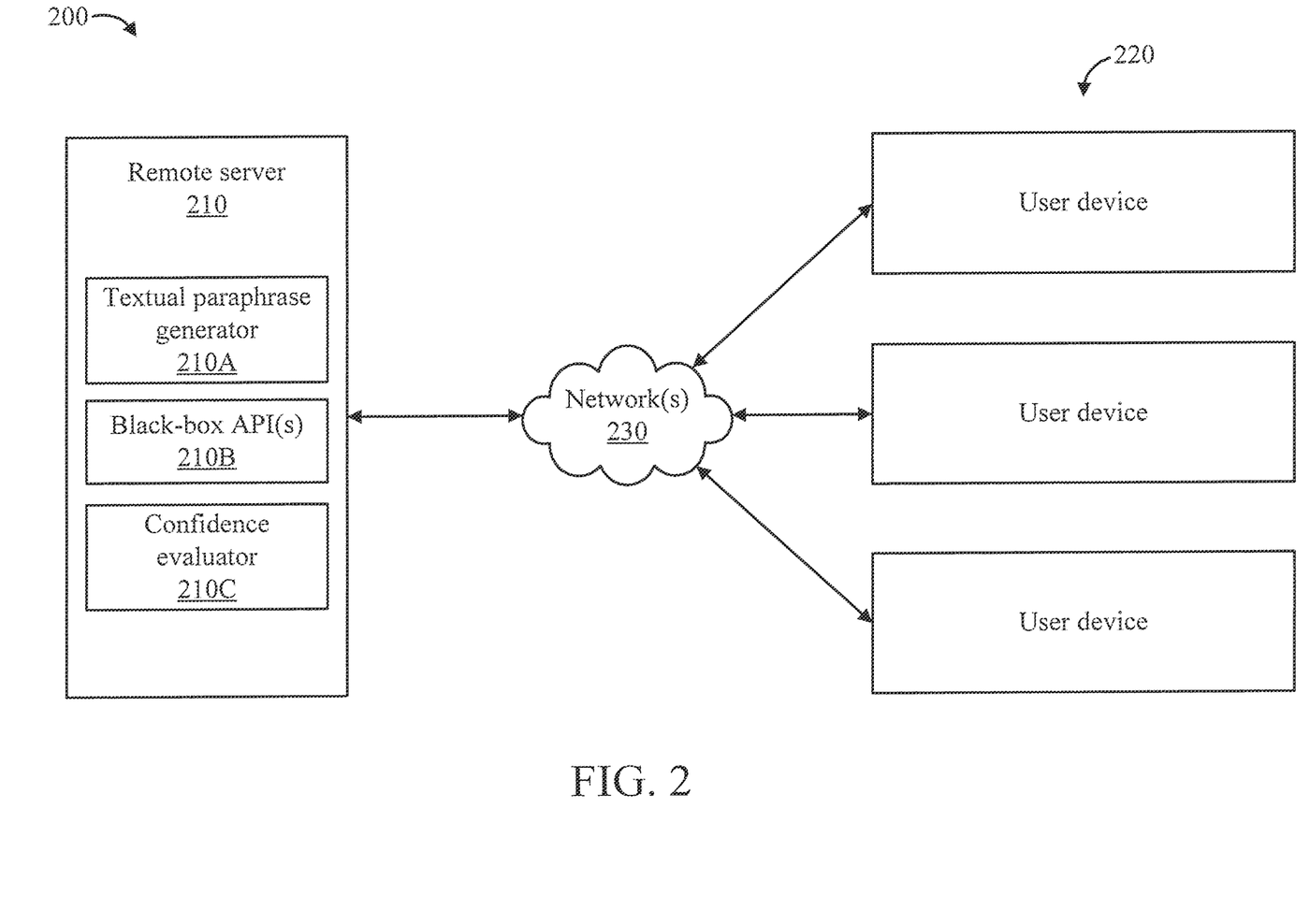
FIG. 2 is a block diagram showing an exemplary environment, in accordance with an embodiment of the present invention.

FIG. 2 is a block diagram showing an exemplary environment 200, in accordance with an embodiment of the present invention.

The environment 200 includes a remote server 210 and a set of user devices 220. The set of user devices 220 can access the remote server 210 over one or more networks 230. Each of the set of user devices 220 can be configured similar to computer processing system 100 of FIG. 1 or can be implemented by a different device (e.g., a mobile phone, a tablet, etc.).

The remote server 210 includes a textual paraphrase generator 210A, a black-box API(s) 210B, and a confidence evaluator 210C. Textual phrases are generated by the textual paraphrase generator 210A. The generated textual paraphrases are then evaluated as inputs to the black-box-API 220 based on output confidence scores.

Figure 3:
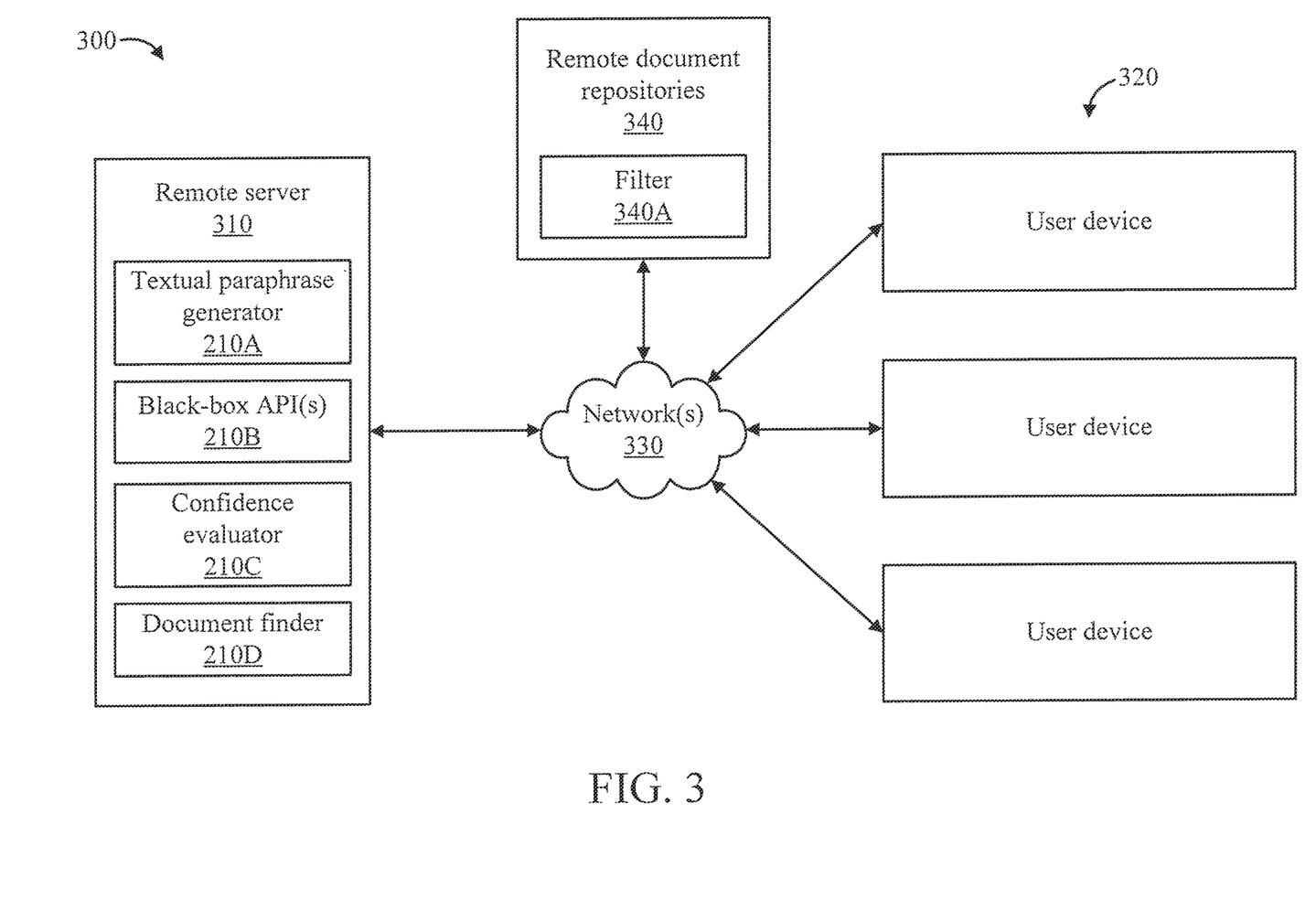
FIG. 3 is a block diagram showing another exemplary environment, in accordance with an embodiment of the present invention.

FIG. 3 is a block diagram showing another exemplary environment 300, in accordance with an embodiment of the present invention.

The environment 300 includes a remote server 310 and a set of user devices 320. The set of user devices 320 can access the remote server 310 over one or more networks 330. Each of the set of user devices 320 can be configured similar to computer processing system 100 of FIG. 1 or can be implemented by a different device (e.g., a mobile phone, a tablet, etc.).

The remote server 310 includes a textual paraphrase generator 310A, a black-box API(s) 310B, a confidence evaluator 310C, and a document finder 310D that finds documents that include one or more the textual phrases. The documents are evaluated as inputs to the black-box-API 310B based on output confidence scores for included ones of the textual paraphrases. Thus, the documents themselves can be evaluated based on confidence scores of the paraphrases included therein. The documents can be found across the web or can be limited to certain remote document repositories 340 including repositories directed to different domains (news, legal, medical, and so forth). A remote filter 340A may be deployed at the remote document repositories 340 that filters the content thereat to provide back to the user documents that include the paraphrases. Thus, environment 300 can pertain to a document search system where documents supporting an input text and corresponding paraphrases can be found. In this way, information (documents)

can be obtained that agrees (or even disagrees, depending upon how retrieval is configured relative to a threshold) with various premises (input texts/paraphrases). A ranking system can rank the documents (top N) relative to how many of the supporting or negating text and paraphrases are included in each of the documents, their corresponding scores, and so forth. Other ranking methodologies can also be used.

Figure 4:
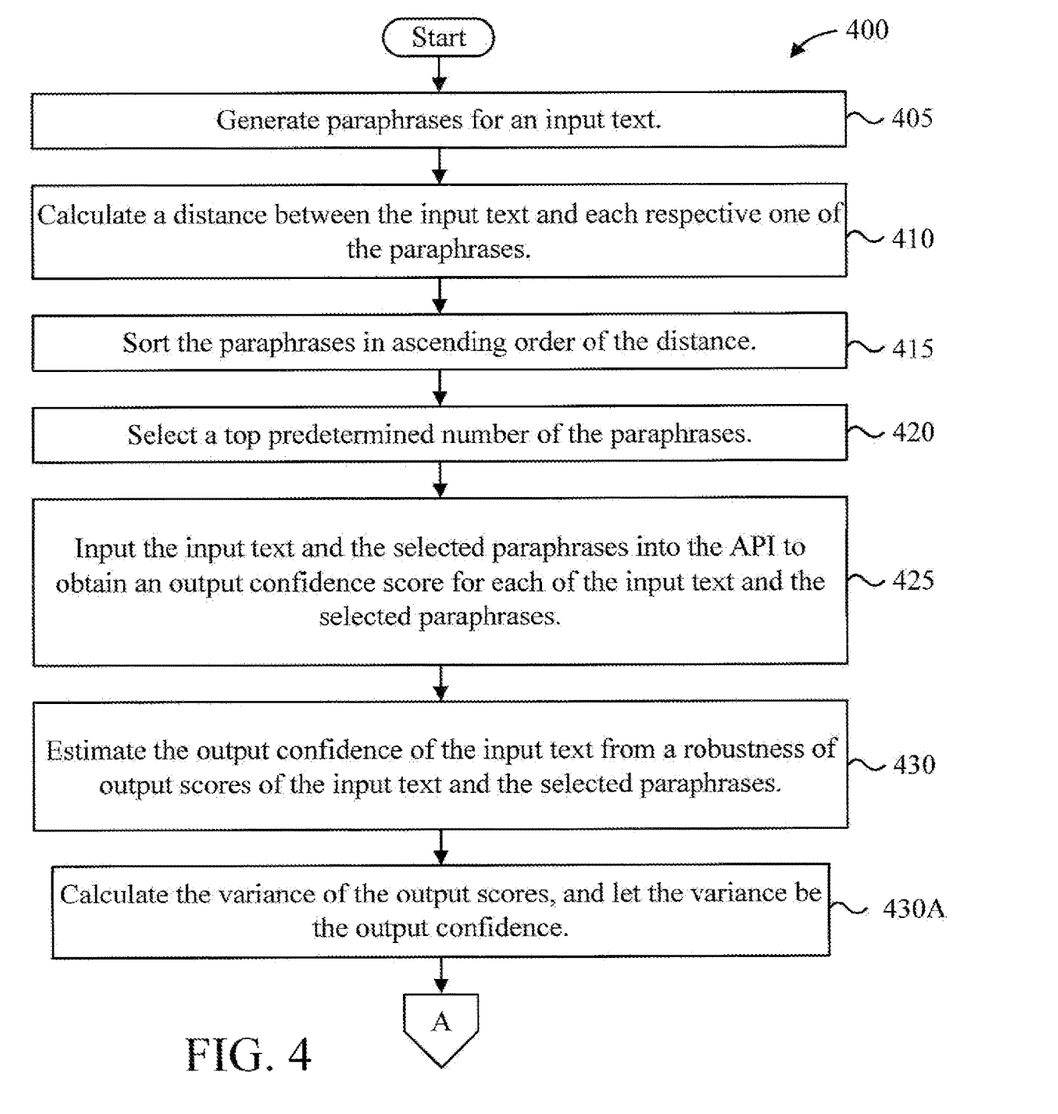
FIGS. 4-5 are flow diagrams showing an exemplary method for estimating an output confidence for a black-box Application Programming Interface (API), in accordance with an embodiment of the present invention.
Figure 5:
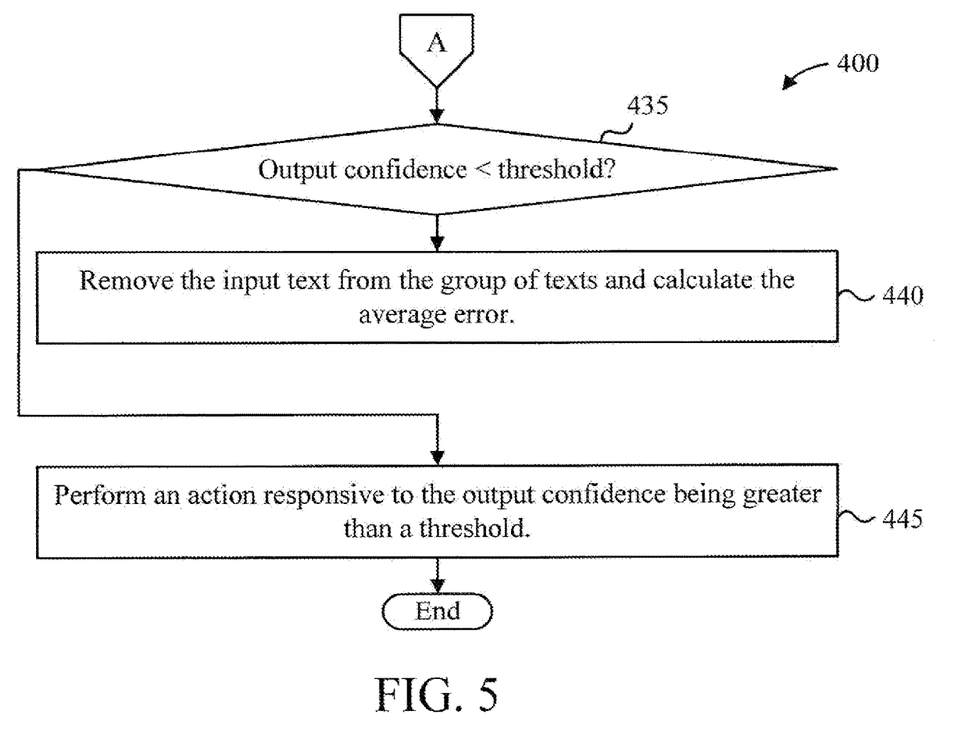
Figure 6:
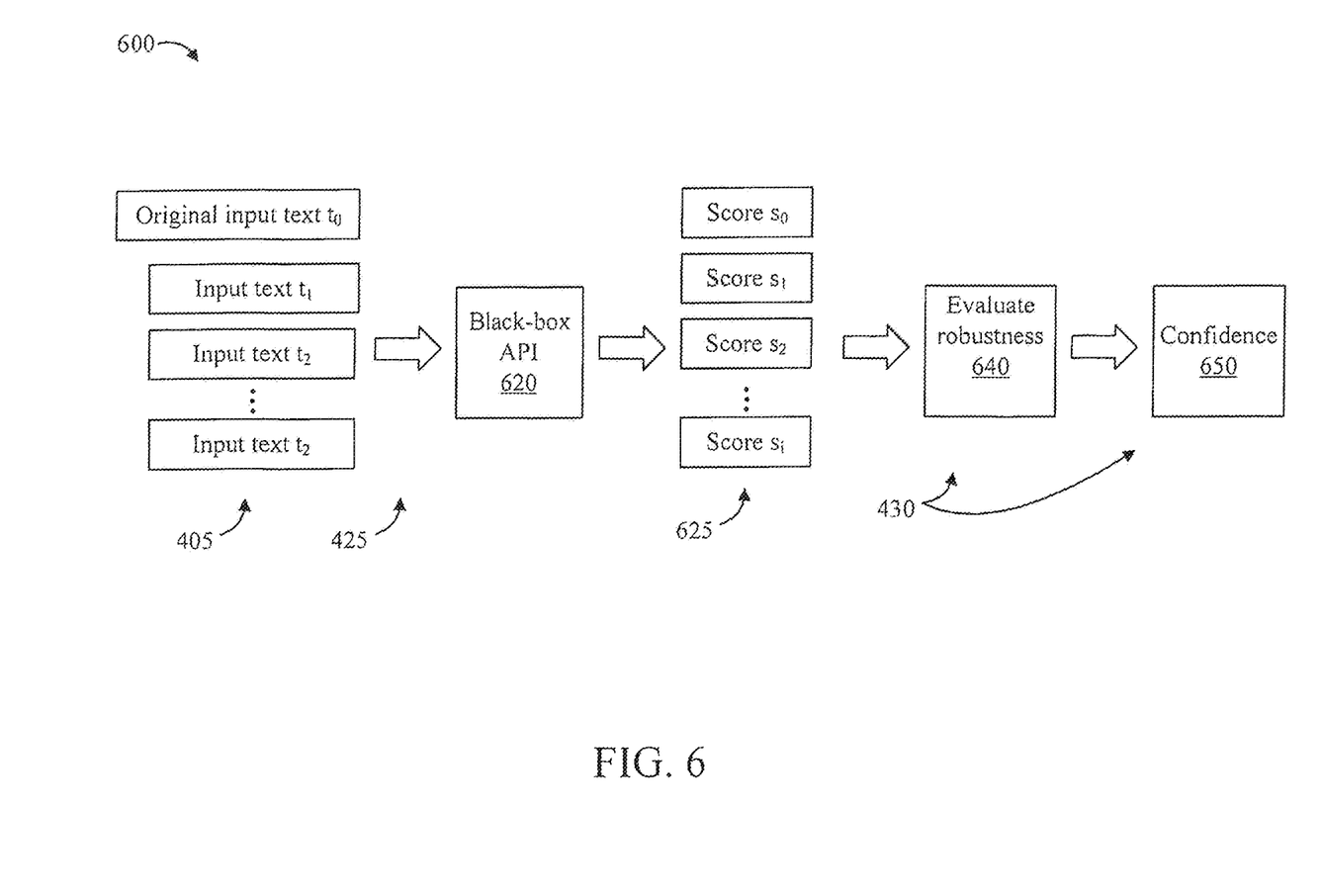
FIG. 6 is a block diagram showing an exemplary processing flow corresponding to at least a portion of the method of FIGS. 4-5, in accordance with an embodiment of the present invention.

FIGS. 4-5 are flow diagrams showing an exemplary method 400 for estimating an output confidence for a black-box Application Programming Interface (API), in accordance with an embodiment of the present invention. FIG. 6 is a block diagram showing an exemplary processing flow 600 corresponding to at least a portion of method 400 of FIGS. 4-5, in accordance with an embodiment of the present invention.

At block 405, generate paraphrases for an input text.

At block 410, calculate a distance between the input text and each respective one of the paraphrases. In an embodiment, the distance is an edit distance.

At block 415, sort the paraphrases in ascending order of the distance.

At block 420, select a top predetermined number of the paraphrases.

At block 425, input the input text and the selected paraphrases into the API 620 to obtain an output score for each of the input text and the selected paraphrases.

At block 430, estimate the output confidence 650 of the input text from a robustness 640 of output scores 625 of the input text and the selected paraphrases. As used herein, the term "robustness" refers to "how small the distance/variance of the output scores are", with smaller values for distance/variance indicative of greater robustness, and vice versa.

In an embodiment, block 430 includes block 430A.

At block 430A, calculate the variance of the output scores, and let the variance be the output confidence. In an embodiment, the output confidence can be estimated such that an increasing variance of the output score corresponds to a decreasing of the output confidence.

At block 435, determine whether the output confidence is below a threshold. If so, then proceed to block 440. Otherwise, proceed to block 445.

At block 440, remove the input text from the group of texts and calculate the average error. This average error for the group of texts will be less than when the input text was included in the group of texts due to the removal of the input text when the resulting output confidence is below the threshold, since removed data is not used to calculate average error.

At block 445, perform an action responsive to the output confidence being greater than a threshold. In an embodiment, the threshold can be set to a point corresponding to an affirmation of an input text due to a high confidence value (above the threshold).

Exemplary actions can include for example, an action that results in a transformation of state of an object implicated by the input texts to the black-box API. For example, an object implicated by the input texts can be changed from a powered state to an unpowered state, a purchase can be made of an object implicated by the input texts, preventing any inputs having a confidence score below the threshold from being input into the black-box API in the future in order to prevent a failure thereof based on an uninterpretable and/or otherwise bad input, etc. For example, in an embodiment, removed phrases are still stored in order to determine that there were previously removed and that they should no longer be input into the black-box API.

Figure 7:
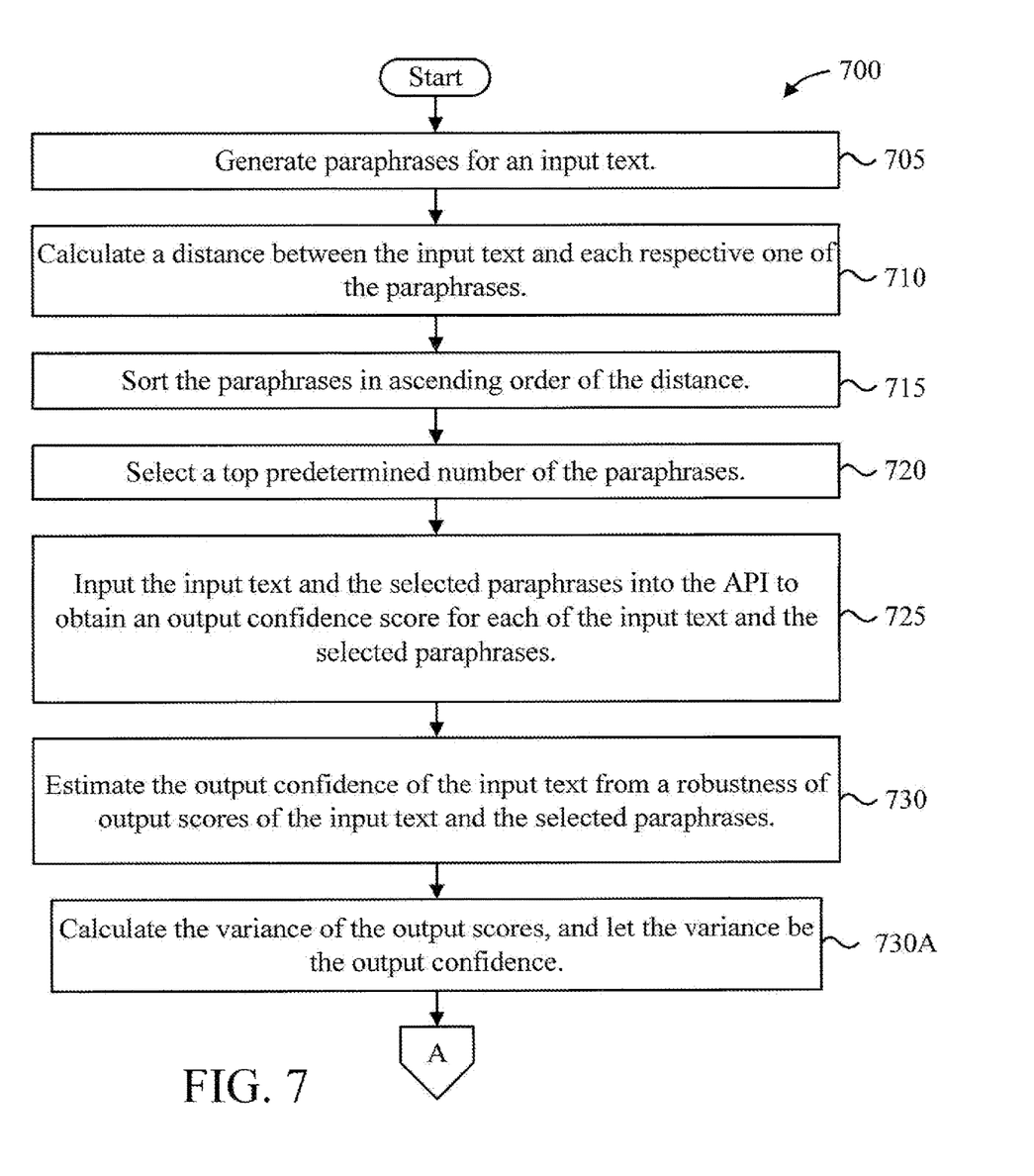
FIGS. 7-8 are flow diagrams showing another exemplary method for estimating an output confidence for a black-box Application Programming Interface (API), in accordance with an embodiment of the present invention.
Figure 8:
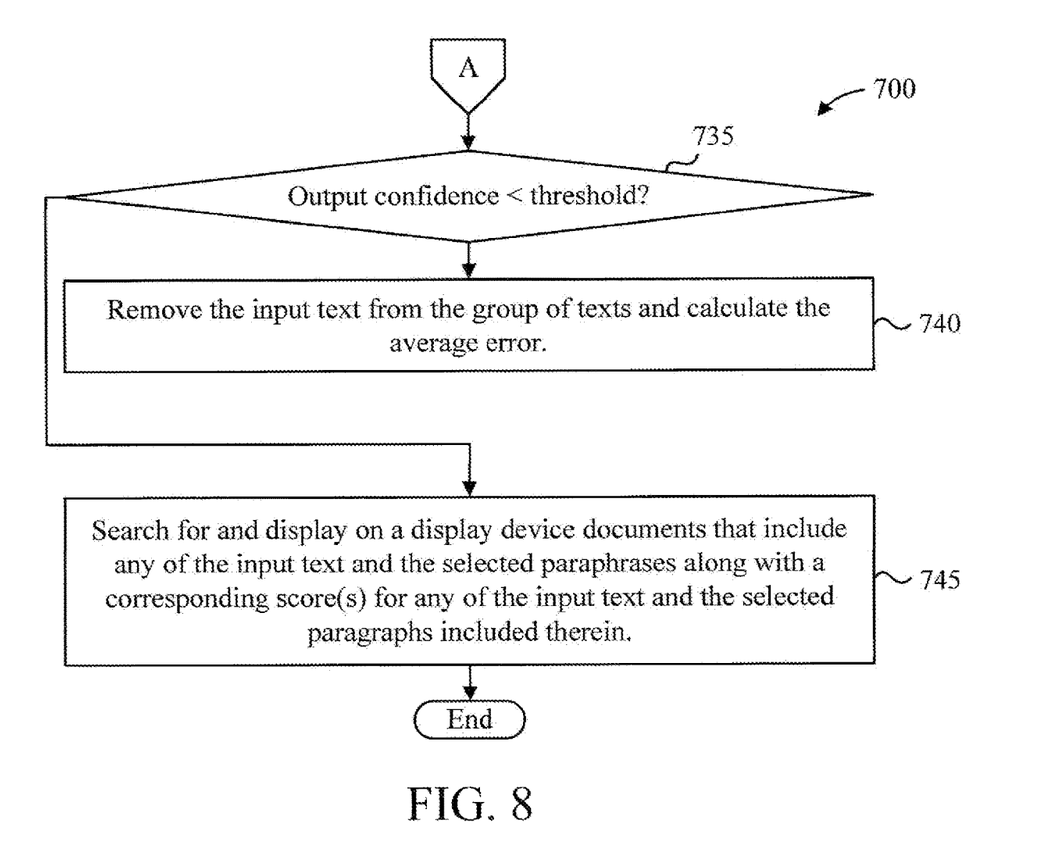

FIGS. 7-8 are flow diagrams showing another exemplary method 700 for estimating an output confidence for a black-box Application Programming Interface (API), in accordance with an embodiment of the present invention.

At block 705, generate paraphrases for an input text.

At block 710, calculate a distance between the input text and each respective one of the paraphrases. In an embodiment, the distance is an edit distance.

At block 715, sort the paraphrases in ascending order of the distance.

At block 720, select a top predetermined number of the paraphrases.

At block 725, input the input text and the selected paraphrases into the API to obtain an output score for each of the input text and the selected paraphrases.

At block 730, estimate the output confidence of the input text from a robustness of output scores of the input text and the selected paraphrases. As used herein, the term "robustness" refers to "how small the distance/variance of the output scores are", with smaller values for distance/variance indicative of greater robustness, and vice versa.

In an embodiment, block 730 includes block 730A.

At block 730A, calculate the variance of the output scores, and let the variance be the output confidence. In an embodiment, the output confidence is estimated such that an increasing variance of the output score corresponds to a decreasing of the output confidence.

At block 735, determine whether the output confidence is below a threshold. If so, then proceed to block 740. Otherwise, proceed to block 745.

At block 740, remove the input text from the group of texts and calculate the average error. In an embodiment, a filtering constraint for removing data can be used, where data resulting in a confidence score below a threshold is removed from the group of tests and is not used to calculate the average error. Thus, the average error for the group of texts will be less than when the input text (resulting in the confidence score below the threshold) was included in the group of texts due to the removal of the input text when the resulting output confidence is below the threshold, since removed data is not used to calculate average error per the filtering constraint. The filtering constraint can be imposed on a database (e.g., a remote database) that stores the group of texts. In an embodiment, a log can be kept of the removed texts such that they will be prevented from being input into a black-box API.

At block 745, search for and display on a display device documents that include any of the input text and the selected paraphrases along with a corresponding score(s) for any of the input text and the selected paragraphs included therein.

A further description will now be given regarding generating paraphrases for an input text per blocks 405 and 705, in accordance with an embodiment of the present invention.

TABLE 1 shows an original top text (t0) and its paraphrases (t1, t2, . . . ) relative to a recession, in accordance with an embodiment of the present invention.

TABLE 1

| Topic text | | Distance |
| --- | --- | --- |
| $t_0$ | U.S. economy will enter a recession. | 0 |
| $t_1$ | The U.S. economy would enter a recession. | 1 |
| $t_2$ | The U.S. economy will enter a recession. | 2 |
| $t_3$ | The U.S. economy would have a recession. | 3 |
| $t_4$ | The economy in America would enter a recession. | 4 |
| $t_5$ | The U.S. economy would fall into a recession. | 4 |
| $t_6$ | The U.S. economy would collapse. | 6 |

TABLE 1-continued

| Topic text | | Distance |
|---|---|---|
| $t_7$ | America economy would fall into a recession. | 6 |
| $t_8$ | The U.S. economy would fall into a recession. | 8 |
| $t_9$ | The U.S. recession would be happened. | 9 |
| $t_{10}$ | It would become a recession in America. | 9 |

TABLE 2 shows an original top text (to) and its paraphrases ($t_1, t_2, \ldots$) relative to Brexit, in accordance with an embodiment of the present invention.

TABLE 2

| Topic text | | Distance |
|---|---|---|
| $t_0$ | The Brexit would have a negative impact on the world economy. | 0 |
| $t_1$ | The Brexit should have a negative impact on the world economy. | 2 |
| $t_2$ | The Brexit would have negative impacts on the world economy. | 3 |
| $t_3$ | The Brexit's economy would have negative impact on the world economy. | 4 |
| $t_4$ | Brexit should have negative consequences on the world economy. | 6 |
| $t_5$ | Brexit would have negative impact on the economy in the world. | 6 |
| $t_6$ | The world economy is negative more about Brexit. | 13 |

A further description will now be given of the distance involved in blocks 410 and 610, in accordance with an embodiment of the present invention.

In an embodiment, as noted above, edit distance can be used. Edit distance is a way of quantifying how dissimilar two strings (e.g., phrases) are to one another by counting the minimum number of operations required to transform one string into the other string. Any type of edit distance may be used. For example, the edit distance can be one of the following or some other distance metric:

Levenshtein distance, which allows deletion, insertion and substitution;

Longest Common Subsequence (LCS) distance, which allows only insertion and deletion, not substitution;

Hamming distance, which allows only substitution, hence, it only applies to strings of the same length;

Damerau-Levenshtein distance, which allows insertion, deletion, substitution, and the transposition of two adjacent characters; and Jaro distance, which allows only transposition.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
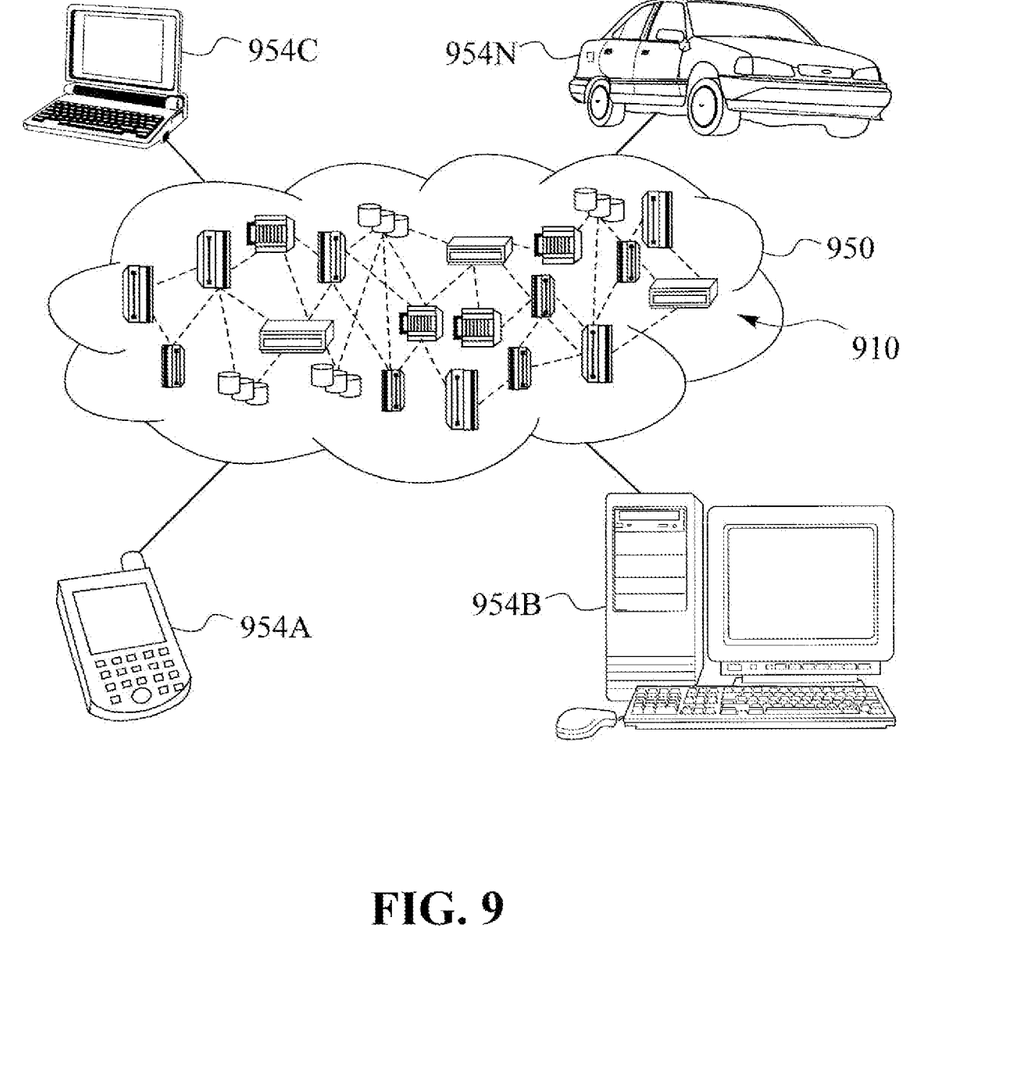
FIG. 9 is a block diagram showing an illustrative cloud computing environment having one or more cloud computing nodes with which local computing devices used by cloud consumers communicate, in accordance with an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
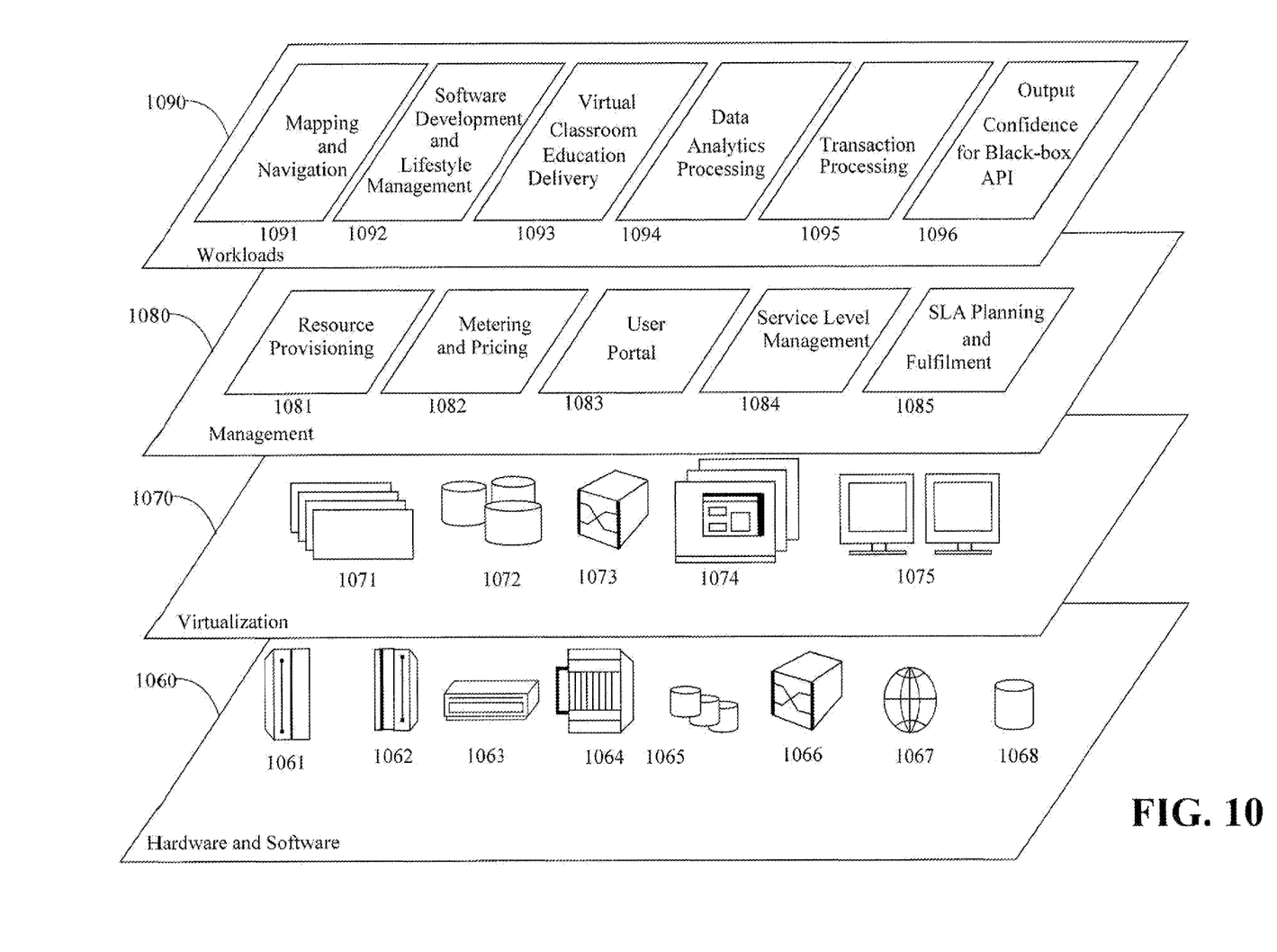
FIG. 10 is a block diagram showing a set of functional abstraction layers provided by a cloud computing environment, in accordance with an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and estimating output confidence for black-box APIs 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for estimating output confidence of a black box Application Programming Interface (API), comprising:
    calculating a distance between input text and a number of generated paraphrases;
    inputting the input text and selected paraphrases into the black box API to obtain an output confidence score for each of the input text and the selected paraphrases;
    estimating, by a hardware processor, output confidence of the input text from a robustness of output confidence scores of the input text and the selected paraphrases based on the distance in relation to the input text and the selected paraphrases in a same language; and automatically purchasing an object that is a subject of an input text and the selected paraphrases, responsive to the output confidence being greater than a threshold.

2. The computer-implemented method of claim 1, wherein the robustness is represented by a variance of the output confidence scores.

3. The computer-implemented method of claim 2, wherein the output confidence decreases with increasing variance of the output confidence scores.

4. The computer-implemented method of claim 1, further comprising removing the input text from a group of texts responsive to the input text resulting in the output confidence being lower than a threshold.

5. The computer-implemented method of claim 4, further comprising calculating an average error as an average of absolute differences between a manual label and the output confidence score for each of the input text not removed and the selected paraphrases.

6. The computer-implemented method of claim 4, wherein removing the input text is implemented as a filtering constraint on a database storing the group of texts.

7. The computer-implemented method of claim 1, wherein the distance is an edit distance.

8. The computer-implemented method of claim 7, wherein the edit distance is calculated relative to operations selected from the group consisting of deletion, insertion, substitution, and transposition.

9. The computer-implemented method of claim 1, further comprising performing an action that transforms a state of an object to another state responsive to the output confidence being above a threshold.

10. The computer-implemented method of claim 1, further comprising searching, in a remote document database, for documents that include any of the input text and the selected paraphrases and providing the documents to a user.

11. A computer program product for estimating output confidence of a black box Application Programming Interface (API), the computer program product comprising a non-transitory computer readable storage medium having program instructions embodied therewith, the program instructions executable by a computer to cause the computer to perform a method comprising:
calculating a distance between input text and a number of generated paraphrases;
inputting the input text and selected paraphrases into the black box API to obtain an output confidence score for each of the input text and the selected paraphrases;
estimating, by a hardware processor, output confidence of the input text from a robustness of output confidence scores of the input text and the selected paraphrases based on the distance in relation to the input text and the selected paraphrases in a same language; and
automatically purchasing an object that is a subject of an input text and the selected paraphrases, responsive to the output confidence being greater than a threshold.

12. The computer program product of claim 11, wherein the robustness is represented by a variance of the output confidence scores.

13. The computer program product of claim 12, wherein the output confidence decreases with increasing variance of the output confidence scores.

14. The computer program product of claim 12, further comprising searching, in a remote document database, for documents that include any of the input text and the selected paraphrases and providing the documents to a user.

15. The computer program product of claim 11, wherein the method further comprises removing the input text from a group of texts responsive to the input text resulting in the output confidence being lower than a threshold.

16. The computer program product of claim 15, wherein the method further comprises calculating an average error as an average of absolute differences between a manual label and the output confidence score for each of the input text not removed and the selected paraphrases.

17. The computer program product of claim 15, wherein removing the input text is implemented as a filtering constraint on a database storing the group of texts.

18. The computer program product of claim 11, wherein the distance is an edit distance.

19. The computer program product of claim 18, wherein the edit distance is calculated relative to operations selected from the group consisting of deletion, insertion, substitution, and transposition.

20. The computer program product of claim 11, wherein the method further comprises performing an action that transforms a state of an object to another state responsive to the output confidence being above a threshold.

21. A computer processing system for determining command-to-process correspondence, comprising:
a memory device including program code stored thereon;
a hardware processor, operatively coupled to the memory device, and configured to run the program code stored on the memory device to:
calculate a distance between input text and a number of generated paraphrases;
input the input text and selected paraphrases into a black box Application Programming Interface (API) to obtain an output confidence score for each of the input text and the selected paraphrases;
estimate, by a hardware processor, output confidence of the input text from a robustness of output confidence scores of the input text and the selected paraphrases based on the distance in relation to the input text and the selected paraphrases in a same language; and
automatically purchase an object that is a subject of an input text and the selected paraphrases, responsive to the output confidence being greater than a threshold.

22. The computer processing system of claim 21, wherein the robustness is represented by a variance of the output confidence scores.

23. The computer processing system of claim 21, wherein the output confidence decreases with increasing variance of the output confidence scores.

24. The computer processing system of claim 21, wherein the distance is an edit distance and the edit distance is calculated relative to operations selected from the group consisting of deletion, insertion, substitution, and transposition.

25. The computer processing system of claim 21, wherein the method further comprises performing an action that transforms a state of an object to another state responsive to the output confidence being above a threshold.

* * * * *